United States Patent
Rose (10) Patent No.: US 11,809,862 B2
(45) Date of Patent: Nov. 7, 2023

(54) RELATED CHANGE ANALYSIS OF MULTIPLE VERSION CONTROL SYSTEMS

(71) Applicant: RED HAT, INC., Raleigh, NC (US)

(72) Inventor: Inbar Hanoch Rose, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 41 days.

(21) Appl. No.: 17/375,787

(22) Filed: Jul. 14, 2021

(65) Prior Publication Data

US 2023/0029262 A1  Jan. 26, 2023

(51) Int. Cl.
*G06F 8/71* (2018.01)
*G06F 16/2458* (2019.01)
*G06F 8/73* (2018.01)

(52) U.S. Cl.
CPC .......... *G06F 8/71* (2013.01); *G06F 8/73* (2013.01); *G06F 16/2474* (2019.01)

(58) Field of Classification Search
CPC ........... G06F 8/71; G06F 16/2474; G06F 8/73
USPC ....................................................... 717/170
See application file for complete search history.

(56) References Cited

U.S. PATENT DOCUMENTS

| | | | |
|---|---|---|---|
| 8,055,619 B2 | 11/2011 | Grossbart et al. | |
| 9,280,572 B2 | 3/2016 | Gopalakrishnan et al. | |
| 9,390,124 B2 | 7/2016 | Hsiao | |
| 9,430,229 B1 | 8/2016 | Rao | |
| 9,594,605 B2 | 3/2017 | Farrugia | |
| 10,936,542 B2 | 3/2021 | Kothari et al. | |
| 2004/0073581 A1 | 4/2004 | McVoy et al. | |

OTHER PUBLICATIONS

Reddy et al., Automation ofVersion Management and Change Propagation, 2017, International Journal of Science . . . , vol. 6,, pp. 154-166. (Year: 2017).*
Gerlac et al., Mining source code changes . . . , 2011, IEEE, pp. 1-5. (Year: 2011).*
Souvik, A.B. (Sep. 2, 2014). "DataHub: Collaborative Data Science Dataset Version Management at Scale," MIT; U. Maryland (UMD); U. Illinois (UIUC), pp. 7.

* cited by examiner

*Primary Examiner* — John Q Chavis
(74) *Attorney, Agent, or Firm* — Womble Bond Dickinson (US) LLP (57) ABSTRACT

A method includes receiving a selection of a first change to a project in a first repository of a plurality of repositories and identifying one or more attributes of the first change to the project. The method further includes identifying a second change to the project in the plurality of repositories in view of the one or more attributes of the first change and performing an action in view of identifying the second change to the project.

17 Claims, 6 Drawing Sheets

RELATED CHANGE ANALYSIS OF MULTIPLE VERSION CONTROL SYSTEMS

TECHNICAL FIELD

Aspects of the present disclosure relate to management of projects in version control systems, and more particularly, to analysis of multiple version control systems to identify related changes.

BACKGROUND

A version control system may be a form of software repository for storing, tracking, and managing versions of a software project. Changes made to a software project can be stored in a version control system as a new version of the project such that the project can be easily rolled back to previous versions without the changes. Some software architectures, such as micro-services or other cloud platforms, may include disparate portions of software that come together to perform a larger cohesive service. Such software architectures may be stored at one or more version control systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Cloud based applications, scalable services, micro-services, and many other software applications may be developed across multiple version control systems, also referred to herein as repositories. For example, when working on a project, or multiple related projects, information may be spread across several different repositories. In some instances, a developer may debug or trace back changes that happened in one repository to similar or related changes in the same or other repositories.

For example, a portion of an application may contain a bug and a developer may identify the code change (e.g., commit) that is causing the bug (e.g., an error in the code). The application may also include several other changes in other repositories that are related to the bug. The other changes related to the bug may provide context or reasons for why the bug has occurred or if similar bugs may occur elsewhere. Conventionally, to debug or trace back changes across several repositories, the developer may manually search each independent repository that includes portions of the application to identify if other changes in the repositories are related to the change causing the bug.

Aspects of the disclosure address the above-noted and other deficiencies by providing a method for analyzing multiple repositories for related changes. For example, processing logic, such as a repository search module, may search multiple repositories using one or more filters with attributes of a selected change to identify changes in the multiple repositories that are related to the selected change. In one example, a developer may select a code change that has been made in one of a set of repositories for which the developer would like to find related changes throughout the set of repositories. The developer may also select one or more attributes of the code change to be used to identify related changes. The repository search module may then automatically search each of the repositories in the set of repositories to find related changes based on the one or more attributes of the code change. The repository search module may then provide the related changes to the developer for review. In one example, the one or more attributes used to search the repositories may include metadata associated with the selected change or portions of the selected change itself.

Embodiments of the present disclosure therefore provide advantages over conventional methods including reducing the time used to correlate and cross-check multiple services. Additionally, automatically locating related changes may provide options for developers to identify related changes based on the most useful information and attributes of a selected change, thus further increasing the efficiency of identifying related changes across several repositories.

Figure 1:
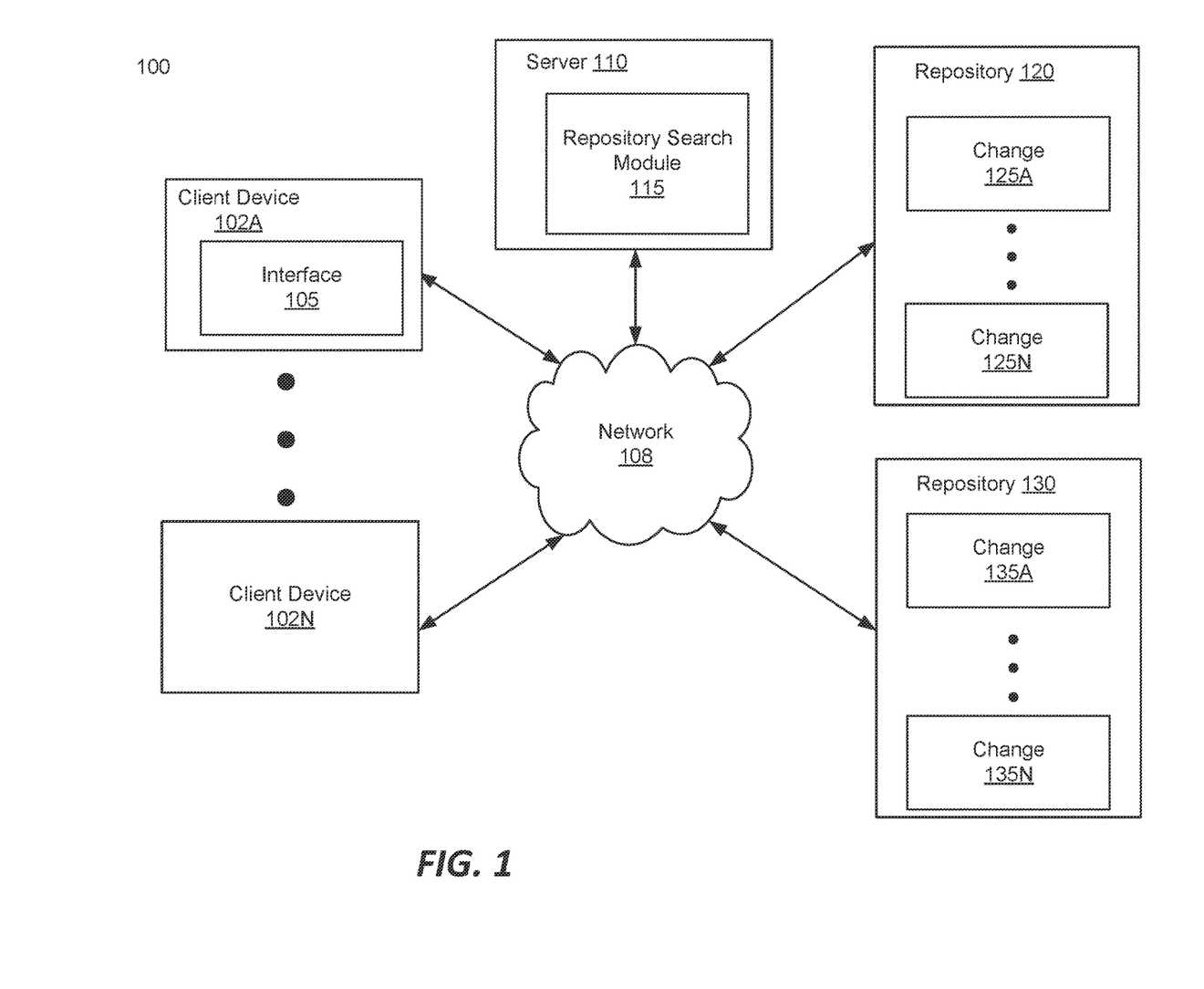
FIG. 1 is a system diagram that illustrates an example system for analyzing multiple version control systems to identify related changes, in accordance with embodiments of the disclosure.

FIG. 1 is a system 100 for identifying related changes across multiple repositories. System 100 includes one or more client devices 102A-N, one or more servers 110, and one or more repositories 120 and 130 coupled via a network 108. Network 108 may be any type of network such as a public network (e.g., the Internet), a private network (e.g., a local area network (LAN), Wi-Fi, or a wide area network (WAN)), or a combination thereof. Client devices 102A-N may be any data processing device, such as a desktop computer, a laptop computer, a mainframe computer, a personal digital assistant, a rack-mount server, a hand-held device or any other device configured to process data. Repositories 120 and 130 may each be a version control system.

Interface 105 may be an application programming interface API, graphical user interface (GUI), or other interface that a user, such as a developer, or an application may use to select a change in a repository and to select one or more attributes of the change to generate a filter via the repository search module 115 to search one or more repositories for related changes.

Server 110 may be any type of server, such as an application server, a web server, an FTP server, or any other type of server with which a user device can communicate. In one example, server 110 hosts the repository search module 115 and client devices 120A-N may interact with repository search module 115 via the server 110. Although depicted as hosted by the server 110, repository search module 115 may also be hosted at one of the repositories 120 or 130 or may execute locally at the client devices 102A-N. For example, repository search module 115 may be included within an integrated development environment (IDE) (e.g., as a plugin) or as a standalone tool.

In one example, repository 120 may include one or more changes 125A-N (otherwise known as commits) to at least a portion of an application stored at the repository 120. Repository 130 may store an additional one or more changes 135A-N to another portion of the application that is stored at the repository 130. In one example, a user of a client device 102A-N (e.g., a developer) may identify a change (e.g., change 125A) in repository 120 for which the user would like to see related changes. For example, a developer may desire to review changes that are related to the change 125A for debugging purposes. The user of the client device 102A may use the repository search module 115 to select change 125A and to select one or more attributes of the change 125A to generate a search filter. The repository search module 115 may then search repository 120, repository 130, and any other repositories associated with the portion of the application managed by repository 120 to identify related changes to the selected change 125A. A related change may be a change that has one or more of the same attributes as the selected change 125A. In one example, a related change may be a change that includes matching attributes for each of the selected attributes of the selected change.

Figure 2:
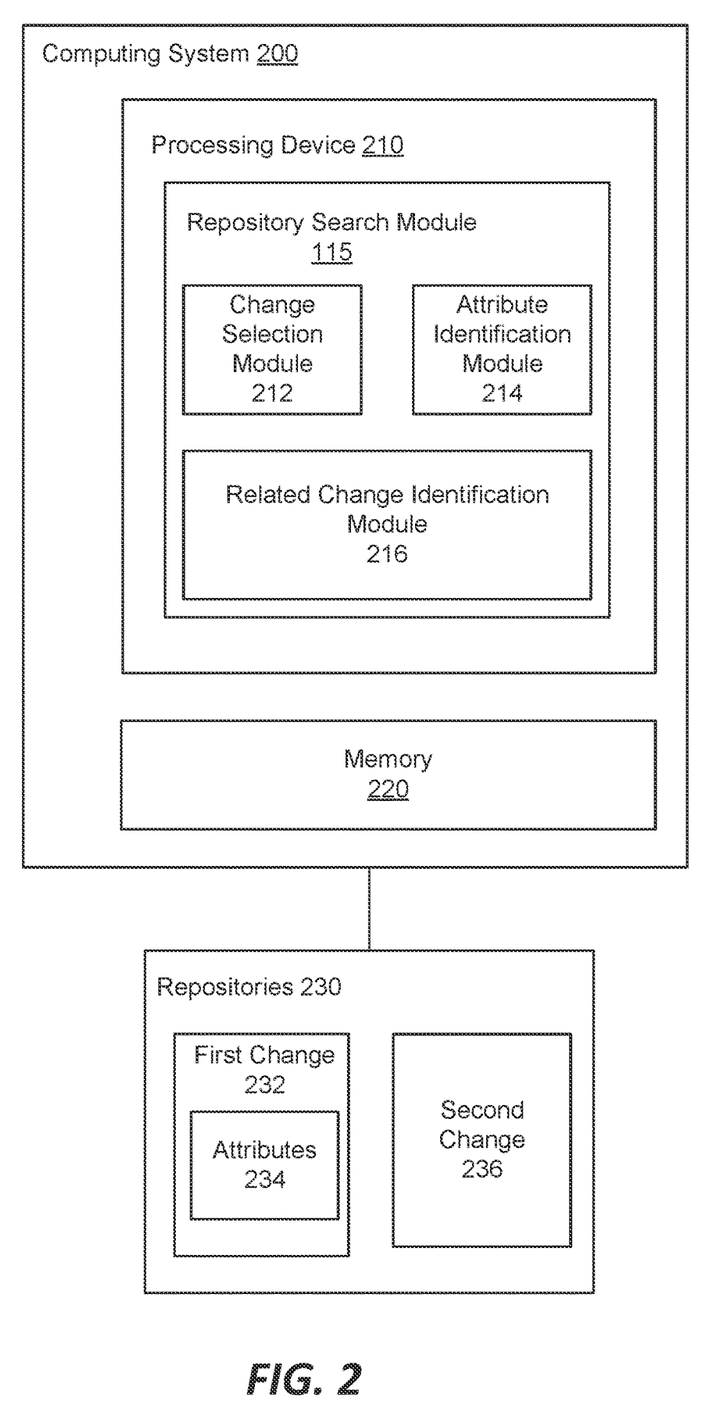
FIG. 2 is a block diagram that illustrates another example of a system for analyzing multiple version control systems to identify related changes, in accordance with embodiments of the disclosure.

FIG. 2 is a block diagram illustrating a computing system 200 for related change analysis across multiple repositories, in accordance with some embodiments. Computing system 200 may include a processing device 210 and memory 220. Memory 220 may include volatile memory devices (e.g., random access memory (RAM)), non-volatile memory devices (e.g., flash memory) and/or other types of memory devices. The computer system 200 may be coupled to one or more repositories 230 for storing and managing software and versions or changes to the software (e.g., first change 232 and second change 236). The processing device 210 may include a repository search module 115 which may further include change selection module 212, attribute identification module 214 and related change identification module 216. The repository search module 115 may be the same, or similar to, repository search module 115 as described with respect to FIG. 1.

In one example, the change selection module 212 of the repository search module 115 may receive a selection of a change (e.g., the first change 232) in the repositories 230. For example, the change selection module 212 may receive a selection of the first change 232 from a client device via a user interface of the client device, an application programming interface (API), or the like. The first change 232 may be a change to code stored in one of the repositories 230 and may include one or more attributes 234. The attributes 234 may include metadata of the first change 232 such as the user that made the change, a timestamp at which the change was committed to the repository, text of the first change 232, or a message (e.g., comments) associated with the change. The attributes 234 may be any information associated with the first change 232.

The attribute identification module 214 may identify one or more of the attributes 234 of the first change 232 in response to the selection of the first change 232. In one example, the attribute identification module 214 may identify the one or more attributes based on a user's selection or identification of attributes to be used to identify related changes. For example, after the selection of the first change 232, a user may define or identify one or more filters with a selection of the attributes to be used to find related changes (e.g., the attributes that match the first change 232 or that must satisfy a condition of the filter with respect to the first change 232). Thus, the attribute identification module 214 may determine one or more attributes defined by the filter and identify the values of the chosen attributes for the first change 232 (e.g., the user, the timestamp, the message or text, etc.). The related change identification module 216 may then use the attributes 234 of the first change 232 identified by the attribute identification module 214 to identify a second change 236 that is related to the first change 232. For example, the second change 236 may include the same attributes as the first change 232. In another example, the second change 236 may satisfy a condition of each attribute defined by a filter for related change analysis. For example, if time is an attribute defined by a search filter and identified by the attribute identification module, then the condition may be that the second change 236 has a timestamp within a length of time from the first change 232. The repository search module 115 may then provide the second change 236 and any other related changes in the repositories 230 to the user (e.g., via a user interface of a client device). The condition for each attribute of the filter may be selected by a user and may include a threshold value for the attribute, a range of values, or any other condition defined by the user.

Figure 3:
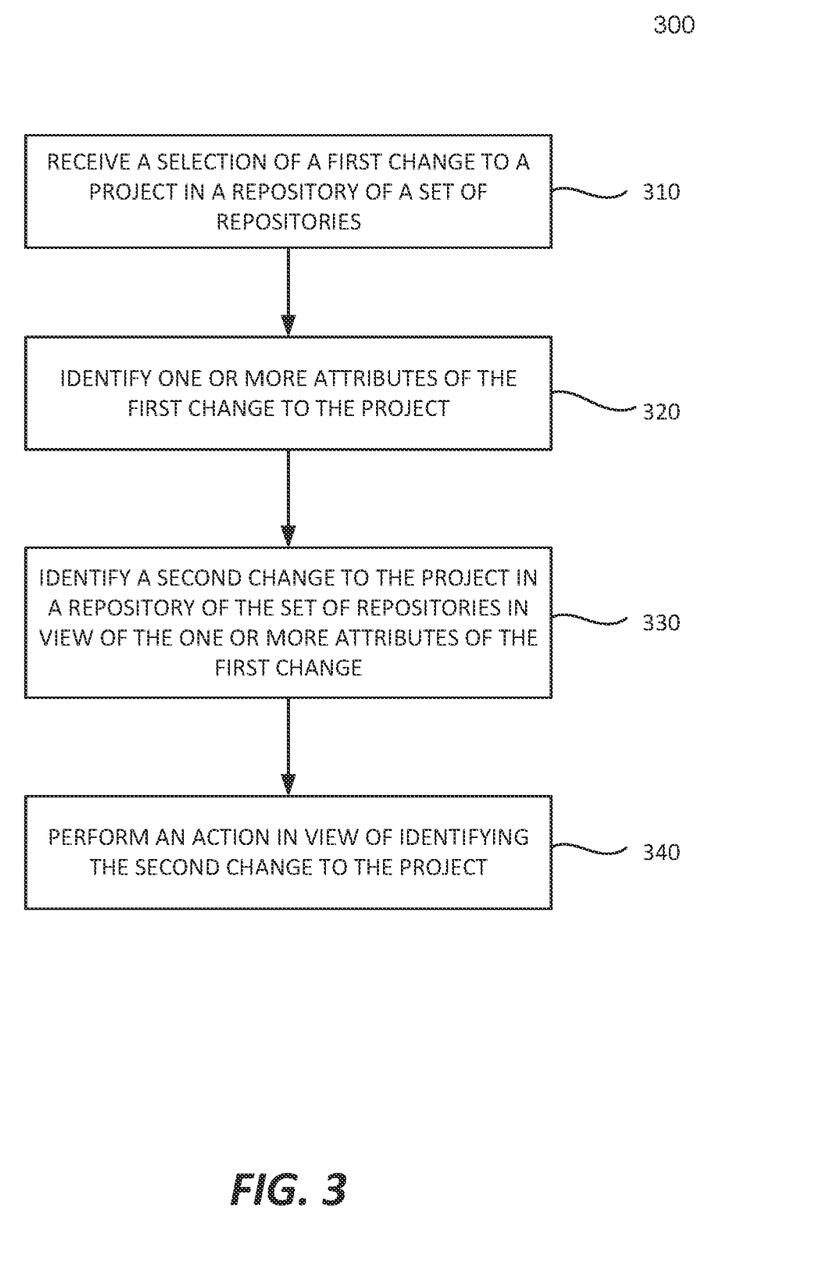
FIG. 3 is a block diagram that illustrates another example of a system for analyzing multiple version control systems to identify related changes, in accordance with embodiments of the disclosure.

FIG. 3 is a flow diagram of a method 300 of virtual machine networking configuration migration, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a repository search module 115 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a selection of a first change to a project in a repository of a set of repositories. The selection of the first change may be received via a user interface of a client device. For example, a user may, using a client device, view changes within a first repository and select one of the changes for which the user would like to see related changes in the same repository as well as related repositories that include software related to the software stored at the first repository. For example, each of the repositories may include independent parts of a larger piece of software that comes together on a single platform as a cohesive application, service, etc. Thus, the software stored at the different repositories may be related and the user may want to see changes at the different repositories that are related to the selected change. For example, the user may want to determine the context of the selected change in view of other changes made throughout the related repositories (e.g., for an added feature or functionality that spans the different parts of the application).

At block 320, the processing logic identifies one or more attributes of the first change to the project. The one or more attributes may be any information associated with the first change such as metadata of the first change or text of the first change itself. For example, the one or more attributes may include: Time (e.g., related changes are within a certain time frame of the selected change), User (e.g., related changes are by the same user of the selected change), Team (e.g., related changes are by the same team as the user of the selected change), Keywords (e.g., related changes have keywords that are user specified), Message ID (related changes' messages contain IDs found in the selected change's message, such as Jira ticket ID), and Message Keywords (e.g., related change messages contain keywords specified by the user). Additionally, a user may also define aliases for users, default time constraints, and present filters.

In some embodiments, a user may define one or more filters or may select from one or more predefined filters that include the one or more attributes. In one example, a user may define a filter that includes a subset of the possible attributes of the first change and conditions for each the attributes. For example, a user may define one attribute of the filter as the user and the condition may be that the user of a related change must match the user of the selected change. In another example, the user may define an attribute of the filter as the time at which it was committed and the condition of the attribute may be that the change must be committed within a certain time from the selected change. In another example, the user may define the filter to use both the time and user attributes in conjunction such that both the user must match and the timestamp must be within a period of time of the selected change. Any number of attributes and combinations of attribute conditions, such as AND/OR combinations may be defined for a filter.

At block 330, the processing logic identifies a second change to the project in a repository of the set of repositories in view of the one or more attributes of the first change. In one example, the processing logic may use the one or more attributes as defined by the user (e.g., via a filter) and search each related repository to identify other changes that satisfy the conditions of the filter. For example, the second change may satisfy the conditions of the filter for each of the one or more attributes with respect to the first change, and may therefore be identified as a related change to the first change. Thus, the processing logic may identify the related changes (i.e., the second change) by identifying attributes of other changes in the repositories that match (or otherwise meet the filter conditions) of the first change.

At block 340, the processing logic performs an action in view of identifying the second change to the project. For example, the processing logic may provide the changes to the user via a user interface. In one example, the user may provide a new change (e.g., commit) to the project to correct or update the first code change in view of the second change. In another example, the user may further make similar or related changes to the second change. In another example, the processing logic may automatically propagate the same or similar changes made to the first change to the second change.

Figure 4:
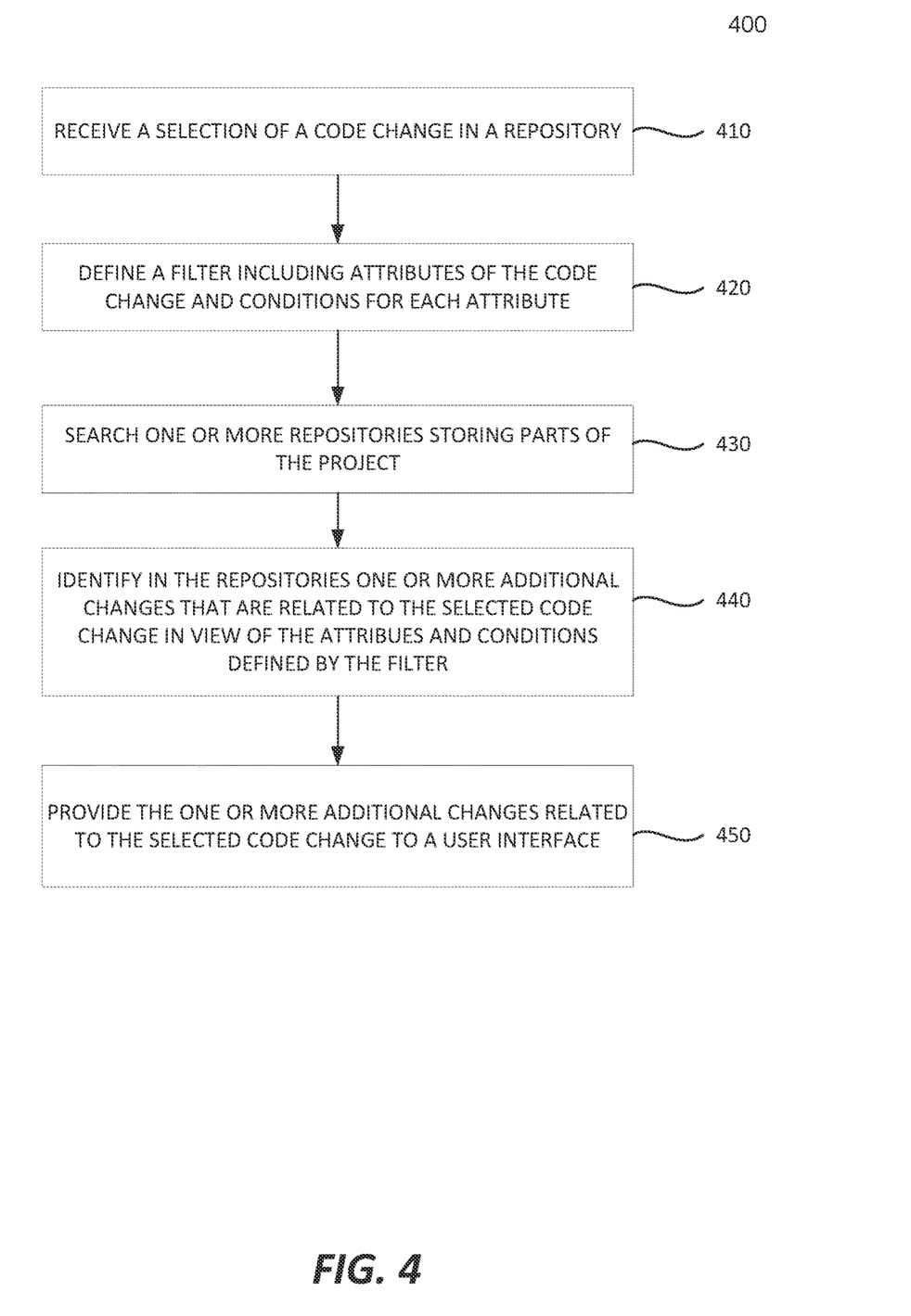
FIG. 4 is a flow diagram of method of identifying related changes to a project in multiple repositories, in accordance with embodiments of the disclosure.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by repository search module 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a selection of a code change in a repository. Separate portions of a project, such as an application using micro-services, may be distributed among several different repositories. For example, each repository may store and manage one or more parts of the distributed application. The separate parts of the application may be deployed together as a single platform (e.g., each part with a particular function). A user, such as a developer, may review code changes (e.g., commits or versions for the application) in the different repositories. In one example, the user may review the changes to identify a code change associated with a bug in the application. The user may select such change to find other changes related to the selected change across the several repositories storing parts of the application.

At block 420, the processing logic defines a filter including attributes of the code change and conditions for each attribute. In one example, a user may select the attributes to be included in the filter and the conditions associated with each attribute. In another example, the user may select from filters that have previously been defined (e.g., preset filters). The attributes may include time, user, team, keywords in a change, message ID, message keywords, or any other attribute or metadata associated with a selected change.

At block 430, the processing logic searches one or more repositories storing portions of the project. As described above, the one or more repositories may be repositories storing separate parts of the application. Each repository may include one or more changes to the respective code (e.g., versions of the code). At block 440, the processing logic identifies, in the repositories, one or more additional changes that are related to the selected code change in view of the attributes and conditions defined by the filter. For example, the processing logic may identify each change in the repository that satisfies the conditions for the attributes defined by the filter with respect to the selected code change.

At block 450, the processing logic provides the one or more additional changes related to the selected code change via a user interface. For example, an IDE may display the related changes to the user via the graphical user interface (GUI) of the IDE. In another example, the related changes may be displayed as a list of related changes for the user to review (e.g., with a link to each of the changes in a corresponding repository). In one example, the user may make another change to address any bugs or other issues of the selected code change or to perform an update on the selected code change. In one example, the new change made to the code of the selected code change may be propagated to the related code changes identified at block 440 in other code repositories.

Figure 5:
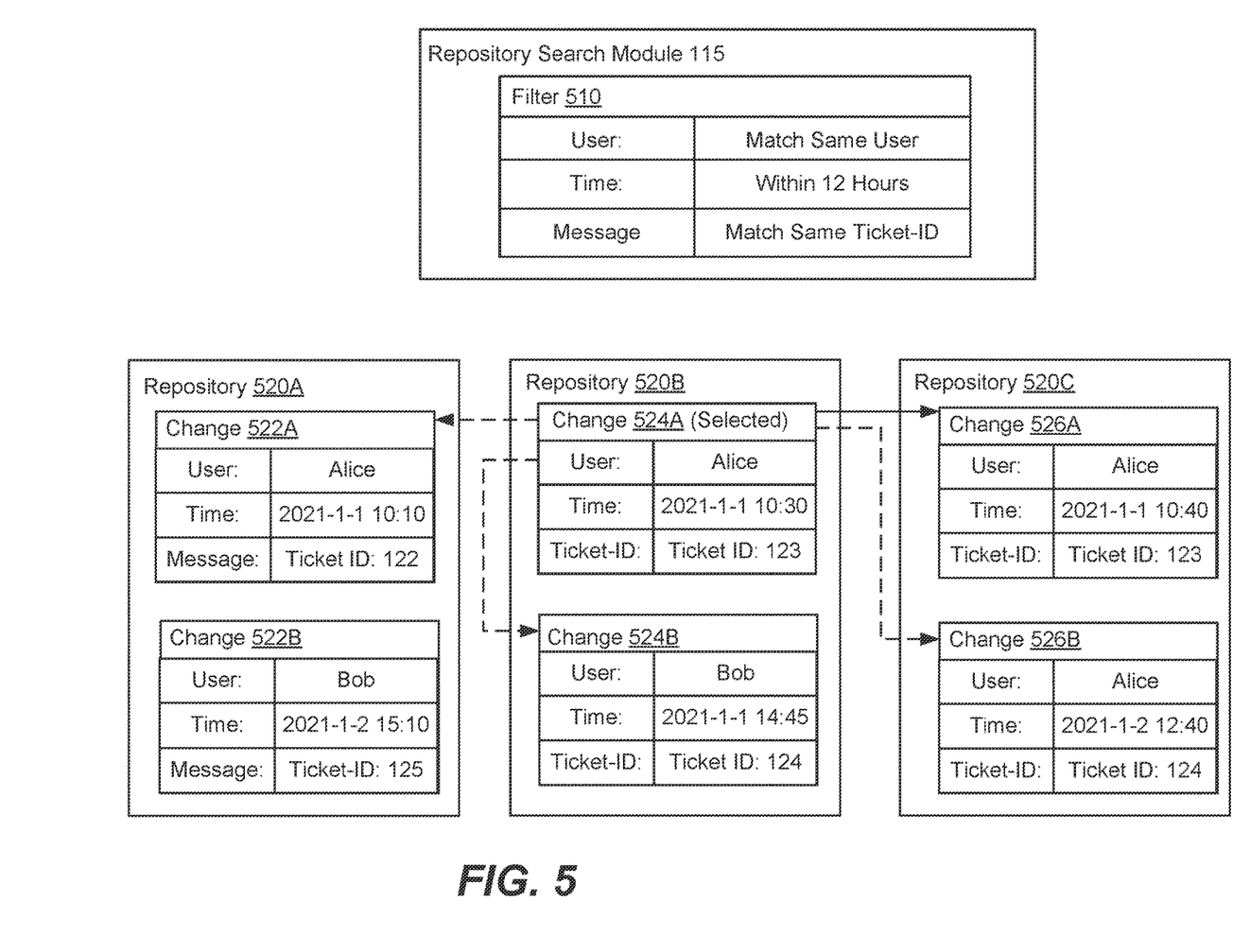
FIG. 5 is a flow diagram of a method of analyzing multiple version control systems to identify related changes, in accordance with embodiments of the disclosure.

FIG. 5 is a block diagram that illustrates a detailed example of performing a related change analysis on multiple repositories. As depicted in FIG. 5, a repository search module 115 may define a filter 510 that includes one or more attributes of a change that are to be used to detect changes that are related to a selected change. Related changes may be part of the same service or application that is distributed over multiple repositories. The repository search module 115 may use the filter 510 to search repositories 520A-C. For example, repository 520A may include changes 522A-B, repository 520B may include changes 524A-B, and repository 520C may include 526A-B. Although FIG. 5 depicts three repositories, each with two changes for simplicity of the disclosure, repository search module 115 may search any number of repositories and each repository searched may include any number of changes.

In one example, change 524A of repository 520B may be selected (e.g., by a developer) to find related changes for 524A. As depicted in FIG. 5, filter 510 may define three attributes that a change must match with the selected change 524A to be identified as a related change. Based on the filter 510 and the selected change 524A, only change 526A may be identified as a related change because each of the defined attributed of change 526A meet the criterion of the filter 510 with respect to change 524A. In particular, the user of change 526A is the same as change 524A, the timestamp of change 526A is within 12 hours of the time stamp of change 524A, the ticket-ID of change 526A is the same as the ticket-ID of change 524A.

In another example, only a subset of the attributes must match the selected change 524A in which case changes 522A, 524B, and 526B may also be identified as a match, or at least a partial match, to change 524A. In particular, the user of change 522A matches the user of the selected change 524A, and the time stamp is within 12 hours of 524A, but the ticket-ID is different. The timestamp of change 524B is the same as the selected change 524A but the user and the ticket-ID are different. Additionally, the user of change 526B is the same as the selected change 524A but the timestamp and the ticket-ID do not satisfy the criterion of filter 510 with respect to change 524A. Thus, the repository search module 115 may identify change 526A in repository 520C a related change of change 524A in repository 520B while identifying changes 522A, 524B, and 526B as potentially related changes.

Figure 6:
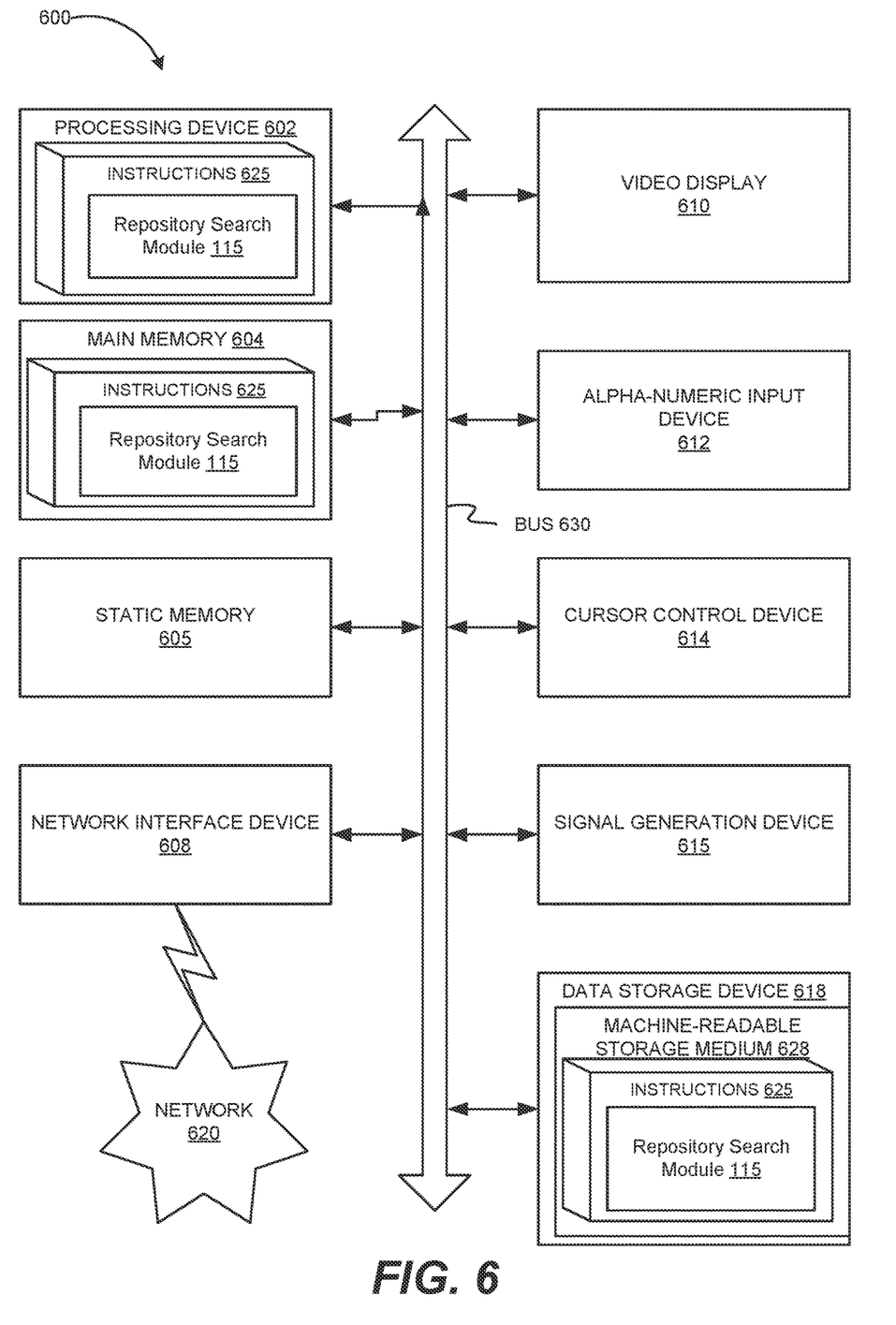
FIG. 6 is a block diagram of an example apparatus that may perform one or more of the operations described herein, in accordance with embodiments of the disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a repository search module, e.g., repository search module 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a selection of a first change to a project in a first repository of a plurality of repositories;
   receiving a selection of one or more attributes defining a search for related changes;
   generating a search filter in view of the one or more attributes, wherein the search filter defines one or more conditions with respect to the one or more attributes;
   identifying values associated with the one or more attributes of the first change to the project, wherein the values associated with the one or more attributes comprise metadata associated with the first change;
   identifying, by a processing device, a second change to the project in the plurality of repositories in view of the second change satisfying the one or more conditions of the search filter with respect to the one or more attributes; and
   providing, by the processing device, an indication of the second change via a user interface, wherein the second change is related to the first change in view of the one or more attributes.

2. The method of claim 1, wherein identifying the second change comprises: searching the plurality of repositories in view of the filter in view of the conditions associated with the one or more selected attributes.

3. The method of claim 1, wherein the second change is stored in a second repository of the plurality of repositories.

4. The method of claim 1, wherein the plurality of repositories comprises a plurality of version control systems.

5. The method of claim 1, further comprising:
   identifying a third change in the plurality of repositories comprising a subset of the one or more attributes of the first change.

6. The method of claim 1, wherein the one or more attributes comprise at least one of a time of the first change, a user that made the first change, a team associated with the user that made the first change, an identification of a message associated with the first change, a keyword of the first change, or a keyword of the message associated with the first change.

7. A system comprising:
a memory; and
a processing device operatively coupled to the memory, the processing device to:
receive a selection of a first change to a project in a first repository of a plurality of repositories;
receive a selection of one or more attributes defining a search for related changes;
generate a search filter in view of the one or more attributes, wherein the search filter defines one or more conditions with respect to the one or more attributes;
identify values associated with the one or more attributes of the first change to the project, wherein the values associated with the one or more attributes comprise metadata associated with the first change;
identify a second change to the project in the plurality of repositories in view of the second change satisfying the one or more conditions of the search filter with respect to the one or more attributes the second change comprising at least one of the one or more attributes of the first change; and
provide an indication of the second change via a user interface, wherein the second change is related to the first change in view of the one or more attributes.

8. The system of claim 7, wherein to identify the second change, the processing device is to: search the plurality of repositories in view of the filter comprising the conditions associated with the one or more selected attributes.

9. The system of claim 7, wherein the second change is stored in a second repository of the plurality of repositories.

10. The system of claim 7, wherein the plurality of repositories comprises a plurality of version control systems.

11. The system of claim 7, wherein the processing device is further to:
identify a third change in the plurality of repositories comprising a subset of the one or more attributes of the first change.

12. The system of claim 7, wherein the one or more attributes comprise at least one of a time of the first change, a user that made the first change, a team associated with the user that made the first change, an identification of a message associated with the first change, a keyword of the first change, or a keyword of the message associated with the first change.

13. A non-transitory computer-readable storage medium including instructions that, when executed by a processing device, cause the processing device to:
receive a selection of a first change to a project in a first repository of a plurality of repositories;
receive a selection of one or more attributes defining a search for related changes;
generate a search filter in view of the one or more attributes, wherein the search filter defines one or more conditions with respect to the one or more attributes;
identify values associated with the one or more attributes of the first change to the project, wherein the values associated with the one or more attributes comprise metadata associated with the first change; and
identify, by the processing device, a second change to the project in the plurality of repositories in view of the second change satisfying the one or more conditions of the search filter with respect to the one or more attributes; and
provide, by the processing device, an indication of the second change via a user interface, wherein the second change is related to the first change in view of the one or more attributes.

14. The non-transitory computer-readable storage medium of claim 13, wherein to identify the second change, the processing device is to: search the plurality of repositories in view of the filter comprising the conditions associated with the one or more selected attributes.

15. The non-transitory computer-readable storage medium of claim 13, wherein the second change is stored in a second repository of the plurality of repositories.

16. The non-transitory computer-readable storage medium of claim 13, wherein the plurality of repositories comprises a plurality of version control systems.

17. The non-transitory computer-readable storage medium of claim 13, wherein the processing device is further to:
identify a third change in the plurality of repositories comprising a subset of the one or more attributes of the first change.

* * * * *